Patented Mar. 29, 1949

2,465,338

UNITED STATES PATENT OFFICE 2,465,338

METHOD FOR TYROTHRICIN PRODUCTION

Winifred R. Mitchell, Lynbrook, N. Y., assignor to Commercial Solvents Corporation, Terre Haute, Ind., a corporation of Maryland No Drawing. Application September 26, 1945, Serial No. 618,793

9 Claims. (Cl. 195—96)

This invention relates to a method for preparing tyrothricin by the propagation of the organism Bacillus brevis on nutrient media, and more particularly to a process utilizing as an essential constituent of the nutrient medium, the liquid stillage residues from the yeast fermentation of cereal grain mashes in the production of ethyl alcohol.

It has been known that the organism Bacillus brevis when propagated on certain nutrient media is capable of producing a material having antibiotic activity against certain pathogenic organisms. This antibiotic material has been named tyrothricin and recently has been found to contain at least two individual antibiotics, gramicidin and tyrocidin.

The media used in the past for propagating the organism Bacillus brevis have included some of the expensive laboratory media such as tryptone, peptone and yeast extract. Such media supported growth and tyrothricin production only when cultured in shallow, stationary layers, and not in aerated submerged cultures of such media. A less expensive medium has recently been developed for surface culture of Bacillus brevis utilizing cannery wastes such as asparagus butt juice.

Recently it has been found that Bacillus brevis could be grown in submerged aerated cultures and would produce tyrothricin, in a so-called synthetic medium containing glucose, nutrient salts and the amino acid asparagine or d-glutamic acid.

All of these media, however, produced low yields of tyrothricin, the maximum yields being of the order of between 100 to 200 mg. of tyrothricin per liter of culture liquor. Moreover, such media were altogether unsatisfactory for the commercial preparation of the antibiotic because of the expense and lack of availability of the ingredients, particularly of the amino acids used as the nitrogen source.

I have now found that relatively much higher yields of tyrothricin may be produced than have heretofore been possible, by a submerged culture method in which a culture medium is utilized, comprising as an essential ingredient of the said culture medium for the propagation of the organism Bacillus brevis and inexpensive commercial waste material resulting from the yeast fermentation of cereal grain mashes in the production of ethyl alcohol.

In preparing ethyl alcohol from cereal grains, the grain is ground, a mash prepared by adding water, cooking and saccharifying for example with malt or diastatic enzymes. The mash is inoculated with an active yeast culture, and allowed to ferment to produce ethyl alcohol. After fermentation, the fermented mash is distilled to remove alcohol and the stillage is screened to remove coarse solids (distillers grains). The resulting liquid residue remaining after removal of the alcohol and coarse solids is commonly known as "thin grain slop" or "thin grain stillage" and is a waste product usually discarded.

In carrying out my invention, I utilize these waste residues or so-called "thin grain stillage" from yeast fermentation of any of the common grains, including wheat, corn, oats, barley, buckwheat, milo and the like and prepare the culture medium by utilizing the stillage as it is obtained from the still or by diluting the stillage somewhat if desired. Or the "stillage" may be dried, and subsequently reconstituted in water to the same or other desired concentration. A sugar such as glucose may be added if desired. The medium is then sterilized, the pH adjusted to a slightly alkaline reaction and the medium inoculated with an active culture of Bacillus brevis. The culture medium is then maintained at a temperature favorable to the growth and tyrothricin production of the organism preferably between about 30 to 40° C.

The fermentation according to my invention is carried out as a submerged process, that is, one wherein the organism grows throughout the mass of the liquid medium in depth. I carry out my process as a submerged operation because of its commercial advantages, and, in order to support the growth of Bacillus brevis, which is an aerobic organism, the medium is supplied with oxygen in the form of sterile air or other oxygen-containing gas, in such a way that sufficient oxygen for efficient growth and tyrothricin production is made available to the organism during the course of the fermentation.

This "aeration" may be accomplished in any desired manner as by shaking or rotating the fermentation vessel in the presence of air or by forcing streams of air through the medium under a positive pressure. In commercial equipment aeration may advantageously be accomplished by the use of porous tubes in the fermentation vessel, through which air is forced in fine bubbles and is evenly dispersed through the medium. The dispersion of the air may be aided by gentle agitation if desired.

While the thin grain stillage may be used as the only nutrient material in my culture medium, I may also utilize it in admixture with other nutrient materials, and preferably in admixture with small proportions of a sugar such as glucose, which may be a commercial glucose such as the material known as "cerelose."

The thin grain stillage, usually having a solids content of about 3 to 6%, may be used as such or may be diluted so as to utilize only 25% or other intermediate proportion of this material and still produce appreciable yields of tyrothricin. However, I prefer to utilize a medium containing at least about 50% thin grain stillage in conjunction with between about 1% and 5% glucose for best yields of tyrothricin.

The culture for inoculating the medium may be prepared in any desired known manner such as by allowing the spores of a stock culture to propagate on any suitable nutrient medium at favorable growth temperatures for a period sufficient to initiate growth and produce an active culture. A series of transfers at suitable intervals may be resorted to if desired. If the organism is carried on a nutrient agar slant it is usually sufficient to develop it by transferring a small amount of this growth to a few hundred milliliters of liquid nutrient medium and to incubate this medium for a period of about 18 to 24 hours. A portion of this active culture is then used to inoculate the main fermentation medium, using a greater or lesser quantity depending on the quantity of the medium to be fermented. Usually quantities in the neighborhood of 0.5 ml. of active culture per liter of culture medium will be sufficient to assure good growth and tyrothricin production in the medium.

The following specific examples will further illustrate my invention.

EXAMPLE I

A series of culture media were prepared as indicated in Table I below using thin grain stillage residues from the ethyl alcohol fermentation process wherein whole ground wheat had been used as the mash. The media were prepared in the proportions listed in the table, were adjusted to pH of 6, were sterilized by autoclaving at 120° C. for thirty minutes. The various media were then aseptically adjusted to pH 7.5 and were inoculated with .5%, based on the volume of the medium, of a 24 hour old surface culture of Bacillus brevis. The media were then incubated at 37° C. for a period of six days. Cultures of each medium were continuously aerated by shaking the partially filled vessels on a mechanical shaker during incubation which completely submerged the growing culture and kept it in a state of aeration. Duplicates in each case were allowed to grow in a quiescent state to compare yields by surface and submerged culture methods. Table I below lists the results obtained.

TABLE I

Tyrothricin production using thin grain whole wheat slop as a culture medium for Bacillus Brevis

| Medium | Yields in grams per liter | | | |
|---|---|---|---|---|
| | 4 days | | 6 days | |
| | Submerged | Surface | Submerged | Surface |
| Thin grain slop | 0.6 | 1.2 | 0.5 | 1.5 |
| Thin grain slop+0.5% "cerelose" | 0.6 | | 0.5 | .9 |
| Thin grain slop+1.0% "cerelose" | 0.6 | | .6 | 1.56 |
| Thin grain slop+2.0% "cerelose" | 0.8 | | .7 | 3.0 |
| Thin grain slop+3.0% "cerelose" | 0.55 | | 1.9 | 3.0 |
| 50% Thin grain slop | .51 | | .46 | .64 |
| 75% Thin grain slop | .5 | | .47 | .64 |
| 25% Thin grain slop | .36 | | .34 | .41 |
| 50% Thin grain slop+3.0% "cerelose" | .58 | | 1.4 | 2.8 |
| 50% Thin grain slop+2.0% "cerelose" | .58 | | 1.8 | 3.0 |
| 3% Tryptone+3% "cerelose"+beef extract, 0.3% yeast extract, 0.3% | 1.1 | | .32 | .72 |

EXAMPLE II

Two 80 gallon fermenters were charged to 60 gallons with a culture mixture composed of 50% thin grain wheat stillage and 2% glucose, the remainder water. The mixture was adjusted to a pH of 7.2 and sterilized by steam at 15 lbs. pressure for 45 minutes. The charge was cooled to 37° C. and inoculated with a fourth generation active culture of Bacillus brevis. The culture medium was maintained at 37° C. and was aerated by means of sterile air forced through a series of porous tubes near the bottom of the fermenters at a rate such that 7½ cubic feet per minute of air was supplied to each fermenter, while the fermenters were maintained under a slight positive pressure. The results in yields of tyrothricin at the periods indicated are listed in Table II below.

TABLE II

Tyrothricin production by Bacillus brevis in wheat stillage medium using forced aeration

[Yields as grams per liter]

| Days | F8 | F3 |
|---|---|---|
| 1 | | |
| 2 | | |
| 3 | 0.4 | 0.6 |
| 4 | 0.8–1.0 | 0.64 |
| 5 | 1.5 | 0.78 |
| 6 | 1.9 | 1.3 |
| 7 | 1.9 | 1.0 |
| 8 | | 1.1 |
| 9 | | 1.2 |
| 10 | | 1.1 |

EXAMPLE III

Waste liquid residues from the yeast fermentation of wheat, barley, buckwheat, oats, barley malt, milo and corn were utilized together with 3% glucose as fermentation media for the propagation of Bacillus brevis. The waste stillage was adjusted in each fermentation to a solids concentration of about 4%.

The compositions of the various media were as follows:

| | Per cent by weight |
|---|---|
| "Thin grain stillage" (solids basis) | 4.0 |
| Calcium carbonate | 0.05 |
| Glucose | 3.0 |
| Tap water | 92.95 |
| | 100.00 |

Media of the above composition using the various cereal grain stillages enumerated were placed in liter flask fermenters, using 150 ml. of medium to each flask. The pH of each medium was adjusted to 7.0, sterilized by autoclaving for 30 minutes at about 120° C. (15 lb. steam pressure). The pH was adjusted after sterilizing to 7.5 to 7.8 with sterile 1 N sodium hydroxide. The flasks were then inoculated with 2% of a culture which had been prepared by transferring a small amount of growth of Bacillus brevis from a 6 day nutrient agar slant to 150 ml. of a liquid medium consisting of 4% corn steep water, 3% glucose, 0.05% $KH_2PO_4$ and 0.05 precipitated $CaCO_3$ at pH 7.5. The inoculum culture was aerated during incubation at 32° C. by shaking for 20 hours.

After inoculation with the active culture above described, the stillage-glucose cultures were allowed to ferment for 8 days at 32° C., during which time they were aerated by shaking.

After this eight day period, the amount of tyrothricin produced in the various substrates was determined by means of the haemolytic assay method of Dimick, J. Biol. Chem. 149, 387 (1943), with the results listed in Table III below. Each result is the average of three replicates.

TABLE III

Tyrothricin production in stillage media from various grains with 3% added glucose after 8 days aerated fermentation at 32° C.

| Type of Grain in Stillage Medium | pH | Average Tyrothricin in Grams per Liter |
|---|---|---|
| Barley | 7.6 | 1.6 |
| Buckwheat | 7.4 | 1.1 |
| Oats | 7.9 | 1.3 |
| Barley Malt | 7.7 | 1.3 |
| Plant Milo | 7.7 | 1.3 |
| Wheat Flour | 8.6 | 2.7 |
| Whole Wheat | 8.3 | 1.3 |
| Corn | 7.8 | 1.0 |
| Wheat—Wheat Flour | 8.5 | 1.5 |

While the above describes the preferred embodiments of my invention, it will be understood that departures may be made therefrom within the scope of the specification and claims.

What is claimed is:

1. In a process for preparing tyrothricin by the propagation of the organism Bacillus brevis on nutrient media, the step which comprises, carrying out the propagation under aerobic submerged conditions in a medium comprising as an essential component, stillage residues resulting from the yeast fermentation of cereal grains in the production of ethyl alcohol.

2. In a process for preparing tyrothricin by the propagation of the organism Bacillus brevis on nutrient media, the steps which comprise carrying out the fermentation in a culture medium comprising as a major essential component stillage residues resulting from the yeast fermentation of cereal grains in the production of ethyl alcohol, while maintaining the growing organism in a submerged state, and supplying oxygen thereto during the course of the fermentation.

3. In a process for preparing tyrothricin, the steps which comprise inoculating with an active culture of Bacillus brevis, a nutrient liquid medium comprising as a major essential nutrient component, stillage residues resulting from the yeast fermentation of cereal grains in the production of ethyl alcohol, agitating said nutrient medium, while maintaining the growth organism in a submerged state, at a temperature between about 30° C. and 40° C. while supplying oxygen to the medium, until tyrothricin has been produced.

4. In a process for preparing tyrothricin, the steps which comprise inoculating with an active culture of Bacillus brevis, a nutrient liquid medium comprising glucose and as a major essential component stillage residues resulting from the yeast fermentation of cereal grains in the production of ethyl alcohol, and allowing the culture to ferment under aerobic submerged conditions until tyrothricin has been formed.

5. The process of claim 4 wherein the cereal grain is wheat.

6. The process of claim 4 wherein the cereal grain is corn.

7. The process of claim 4 wherein the cereal grain is barley.

8. In a process for preparing tyrothricin, the steps which comprise inoculating with an active culture of Bacillus brevis a nutrient liquid medium comprising glucose and as a major essential component thin stillage residue from the yeast fermentation of wheat in the production of ethyl alcohol, agitating the nutrient liquid while maintaining the growing organism in a submerged state, at a temperature between about 30° C. and 40° C. while supplying oxygen to the organism, until tyrothricin has been formed.

9. In the production of tyrothricin, the process which comprises preparing a mash comprising at least about 50 per cent of a thin stillage residue from the yeast fermentation of cereal grains and from about 1 to 5 per cent of glucose, sterilizing the mash, inoculating it with an active culture of Bacillus brevis, blowing air through the mash and maintaining conditions favorable to the submerged growth and tyrothricin production of the organism until tyrothricin is produced and recovering the tyrothricin.

WINIFRED R. MITCHELL.

REFERENCES CITED

The following references are of record in the file of this patent:

UNITED STATES PATENTS

| Number | Name | Date |
|---|---|---|
| 2,098,200 | Stiles | Nov. 2, 1937 |
| 2,107,261 | Legg | Feb. 1, 1938 |
| 2,406,174 | Stokes | Aug. 20, 1946 |

OTHER REFERENCES

Stokes et al., "Formation of Tyrothricin by Submerged Cultures of Bacillus brevis," Jr. Bact., 46, 1, July 1943, pp. 83–88.